(12) United States Patent
Garud et al.

(10) Patent No.: US 9,967,569 B2
(45) Date of Patent: May 8, 2018

(54) METHOD AND APPARATUS FOR REAL-TIME SAO PARAMETER ESTIMATION

(71) Applicant: TEXAS INSTRUMENTS INCORPORATED, Dallas, TX (US)

(72) Inventors: Hrushikesh Tukaram Garud, Maharashtra (IN); Mihir Narendra Mody, Bangalore (IN); Soyeb Nagori, Bangalore (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days. days.

(21) Appl. No.: 15/367,378

(22) Filed: Dec. 2, 2016

(65) Prior Publication Data

US 2017/0085883 A1 Mar. 23, 2017

Related U.S. Application Data

(63) Continuation of application No. 14/447,062, filed on Jul. 30, 2014, now abandoned.

(30) Foreign Application Priority Data

Jul. 30, 2013 (IN) ............................ 3400/CHE/2013

(51) Int. Cl.
*H04N 19/147* (2014.01)
*H04N 19/82* (2014.01)
(Continued)

(52) U.S. Cl.
CPC ......... *H04N 19/147* (2014.11); *H04N 19/117* (2014.11); *H04N 19/149* (2014.11);
(Continued)

(58) Field of Classification Search
CPC .. H04N 19/147; H04N 19/176; H04N 19/149; H04N 19/82; H04N 19/182; H04N 19/117
See application file for complete search history.

(56) References Cited

U.S. PATENT DOCUMENTS

| | | | | |
|---|---|---|---|---|
| 7,499,492 B1 * | 3/2009 | Ameres | ..................... | H04N 7/50 341/65 |
| 2008/0112481 A1 * | 5/2008 | Hsaing | ................... | H04N 19/50 375/240.03 |

(Continued)

*Primary Examiner* — Sath V Perungavoor
*Assistant Examiner* — Howard D Brown, Jr.
(74) *Attorney, Agent, or Firm* — Kenneth Liu; Charles A. Brill; Frank D. Cimino

(57) ABSTRACT

The disclosure provides a sample adaptive offset (SAO) encoder. The SAO encoder includes a statistics collection (SC) block and a rate distortion optimization (RDO) block coupled to the SC block. The SC block receives a set of deblocked pixels and a set of original pixels. The SC block categorizes each deblocked pixel of the set of deblocked pixels in at least one of a plurality of band and edge categories. The SC block estimates an error in each category as difference between a deblocked pixel of the set of deblocked pixels and corresponding original pixel of the set of original pixels. The RDO block determines a set of candidate offsets associated with each category and selects a candidate offset with a minimum RD cost. The minimum RD cost is used by a SAO type block and a decision block to generate final offsets for the SAO encoder.

17 Claims, 6 Drawing Sheets

(51) Int. Cl.
*H04N 19/117* (2014.01)
*H04N 19/182* (2014.01)
*H04N 19/149* (2014.01)
*H04N 19/176* (2014.01)

(52) U.S. Cl.
CPC ......... *H04N 19/176* (2014.11); *H04N 19/182* (2014.11); *H04N 19/82* (2014.11)

(56) References Cited

U.S. PATENT DOCUMENTS

| | | | | |
|---|---|---|---|---|
| 2012/0177103 | A1* | 7/2012 | Fu | H04N 19/82 375/240.02 |
| 2013/0101025 | A1* | 4/2013 | Van der Auwera | H04N 19/176 375/240.03 |
| 2013/0215974 | A1* | 8/2013 | Chong | H04N 19/463 375/240.24 |
| 2013/0266060 | A1* | 10/2013 | Budagavi | H04N 19/00066 375/240.02 |
| 2014/0126630 | A1* | 5/2014 | Park | H04N 19/70 375/240.02 |
| 2017/0230656 | A1* | 8/2017 | Leontaris | H04N 19/117 |

* cited by examiner

METHOD AND APPARATUS FOR REAL-TIME SAO PARAMETER ESTIMATION

CROSS REFERENCES TO RELATED APPLICATIONS

This application is a continuation of and claims priority to U.S. patent application Ser. No. 14/447,062, filed on Jul. 30, 2014, which claims priority from India provisional patent application No. 3400/CHE/2013 filed on Jul. 30, 2013, which are hereby incorporated by reference in their entireties.

TECHNICAL FIELD

Embodiments of the disclosure relate generally to video coding and more particularly to a SAO filter used in video coding standards such as H.264 and H.265.

BACKGROUND

High Efficiency Video Coding (HEVC) is a video coding standard being developed jointly by ITU-T, also known as the Video Coding Experts Group (VCEG), and by ISO/IEC, also known as the Moving Picture Experts Group (MPEG) in the joint collaborative team on video coding (JCT-VC).

A video input signal has multiple frames. HEVC divides a frame into rectangular blocks or LCU (largest coding unit) or macro-blocks of 16×16, 32×32 or 64×64. An optimal size of the LCU is selected based on the video content. The rectangular blocks can be predicted from previously decoded data either by motion compensated prediction or intra prediction. The resulting prediction error is coded by applying block transforms based on an integer approximation of the discrete cosine transform which is followed by the quantization and coding of the transform coefficients.

Transform coding with quantization is a type of data compression which is commonly "lossy" as the quantization process discards a portion of data associated with the transform of the video input, thereby lowering its bandwidth requirement but often also results in quality loss in the reconstructed video.

SAO (Sample Adaptive Offset) encoder is placed in a reconstruction loop of a video encoder and it is placed in the video encoder after a de-blocking filter. SAO is a process of adding offset to de-blocked pixels received from the de-blocking filter. The offset reduces the distortion in the reconstructed image and thus provides a reconstructed video with high quality and PSNR (peak signal to noise ratio) and simultaneously achieving bitrate reduction. SAO encoder is a computation intensive block in HEVC and increases the video decoder/encoder complexity. Therefore, SAO encoder process needs to be optimized to minimize the computational complexity while maximizing bitrate saving, improving visual quality and maintaining compliance set by the HEVC standard.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

An embodiment provides a sample adaptive offset (SAO) encoder. The SAO encoder includes a statistics collection (SC) block that receives a set of deblocked pixels and a set of original pixels. The SC block categorizes each deblocked pixel of the set of deblocked pixels in at least one of a plurality of band categories and a plurality of edge categories. The SC block counts a number of deblocked pixels in each category of the plurality of band categories and the plurality of edge categories and also estimates an error in each category from a difference between a deblocked pixel of the set of deblocked pixels and corresponding original pixel of the set of original pixels.

The SAO encoder also includes a rate distortion optimization (RDO) block that is coupled to the SC block. The RDO block determines a sign of the error in each category, and also determines a set of candidate offsets associated with each category. A value of a candidate offset of the set of candidate offsets is between a maximum candidate offset and a minimum candidate offset. The RDO block estimates a rate distortion (RD) cost associated with each candidate offset of the set of candidate offsets determined for each category. The RDO block also determines a minimum RD cost of the estimated RD costs for each category.

Other aspects and example embodiments are provided in the Drawings and the Detailed Description that follows.

BRIEF DESCRIPTION OF THE VIEWS OF DRAWINGS

DETAILED DESCRIPTION OF THE EMBODIMENTS

Figure 1:
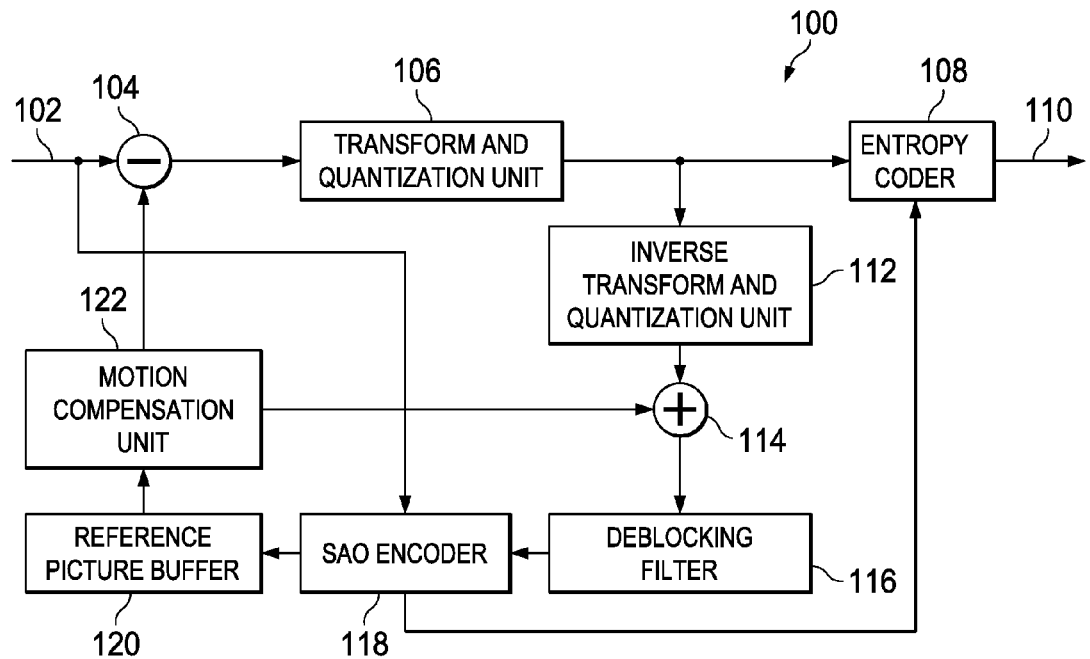
FIG. 1 illustrates a block diagram of a video encoder.

FIG. 1 illustrates a block diagram of a video encoder 100. The video encoder 100 receives a video input 102. A subtractor 104 in the video encoder 100 receives the video input 102. A transform and quantization unit 106 is coupled to the subtractor 104. An entropy coder 108 and an inverse transform and quantization unit 112 are coupled to the transform and quantization unit 106. The entropy coder 108 generates a coded video output 110. The inverse transform and quantization unit 112 is coupled to a summer 114.

A deblocking filter 116 is coupled to the summer 114. A SAO encoder 118, coupled to the deblocking filter 116, receives the video input 102. The entropy coder 108 is coupled to the SAO encoder 118. A reference picture buffer 120 is coupled to the SAO encoder 118. A motion compensation unit 122 is coupled to the reference picture buffer 120 and provides an output to the summer 114 and the subtractor 104. The inverse transform and quantization unit 112, the summer 114, the deblocking filter 116, the SAO encoder 118, the reference picture buffer 120 and the motion compensation unit 122 together form a reconstruction loop of the video encoder 100.

The operation of the video encoder 100 illustrated in FIG. 1 is explained now. The video input 102 has multiple frames. A frame is divided into rectangular blocks or LCU (largest coding units) or macro-blocks and each LCU includes a plurality of pixels. The transform and quantization unit 106 performs transform and quantization on an original LCU received from the subtractor 104. The transform and quantization unit 106 performs a discrete cosine transform (DCT). The transform and quantization unit 106 transforms the pixel data into a spatial frequency domain. This frequency domain data is quantized to form a quantization block.

The inverse transform and quantization unit 112 inversely quantizes the quantization block and performs inverse transform on the result of inverse quantization. As an example, if DCT is performed in the transform and quantization unit 106, inverse DCT is performed in the inverse transform and quantization unit 112.

The deblocking filter 116 smoothens artifacts created by the macroblock nature of the encoding process. The SAO encoder 118 adds an offset to deblocked pixels received from the deblocking filter 116. The offset reduces the distortion in the reconstructed LCU. The reference picture buffer 120 stores the reconstructed LCU. The motion compensation unit 122 performs motion compensation on the motion information received in the reconstructed LCU received from the reference picture buffer 120 to generate a motion compensated LCU. The subtractor 104 subtracts the motion compensated LCU from the original LCU to generate a differential data. Thus, the transform and quantization unit 106 and the entropy coder 108 encodes the differential data rather than the original LCU.

The entropy coder 108 encodes the quantized data received from the transform and quantization unit 106 to generate the coded video output 110. Entropy coder 108 employs a fewer bits to encode more frequently used symbols and more bits to encode less frequently used symbols. This process reduces the amount of encoded data that is to be transmitted and/or stored by the entropy coder 108.

Figure 2:
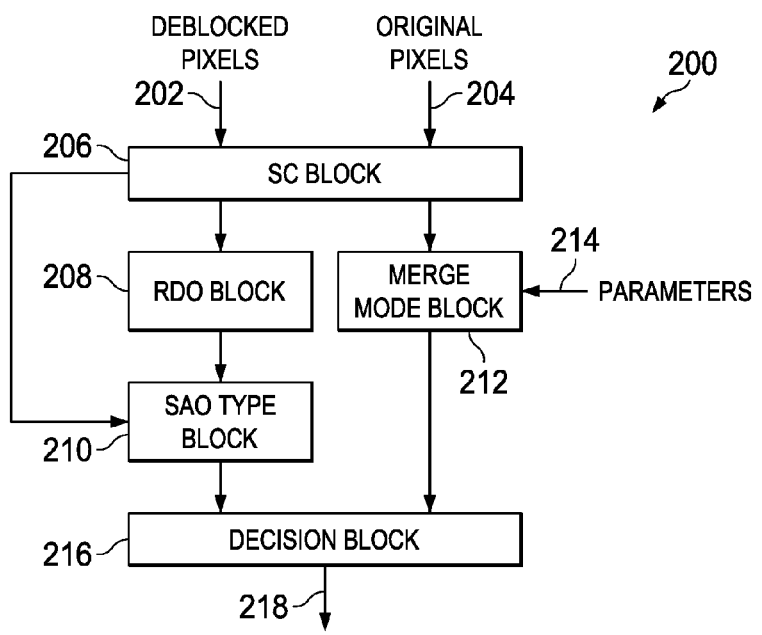
FIG. 2 illustrates a block diagram of a SAO (sample adaptive offset) encoder, according to an embodiment.

FIG. 2 illustrates a block diagram of a SAO (sample adaptive offset) encoder 200, according to an embodiment. The SAO encoder 200 includes a statistics collection (SC) block 206. The SC block 206 receives a set of deblocked pixels 202 and a set of original pixels 204. A rate distortion optimization (RDO) block 208 and a merge mode block 212 are coupled to the SC block 206. A SAO type block 210 is coupled to the RDO block 208 and the SC block 206. A decision block 216 is coupled to the SAO type block 210 and the merge mode block 212. The SAO encoder 200 may include one or more additional components known to those skilled in the relevant art and are not discussed here for simplicity of the description.

The operation of the SAO encoder 200 illustrated in FIG. 2 is explained now. The SC block 206 receives the set of deblocked pixels 202 and the set of original pixels 204. The set of original pixels 204 corresponds to a current LCU. A deblocking filter (not illustrated in FIG. 2) generates the set of deblocked pixels 202. The current LCU includes a luma component and a chroma component. The chroma component further includes a Cb component and a Cr component. The SC block 206 categorizes each deblocked pixel of the set of deblocked pixels 202 in at least one of plurality of band categories and a plurality of edge categories. In one example, the SAO encoder 200 includes 32 band categories and 4 edge types. Each of the four edge types are further sub-divided into four edge categories. Therefore, there are a total of 16 edge categories and a total of 48 categories (32 band categories and 16 edge categories).

In another example, the 32 band categories are B0, B1 till B31. The four edge types are 0 degree, 90 degree, 135 degree and 45 degree. Each of these edge types is further sub divided into edge categories defined as category 1, category 2, category 3 and category 4. In yet another example, the band categories and the edge categories are compliant with the HEVC standard.

Each deblocked pixel is categorized into one of these categories. In one example, a deblocked pixel is categorized in multiple edge categories. In another example, a deblocked pixel is categorized in multiple edge types. For example, a deblocked pixel categorized in edge type 0 degree—category 1, is also categorized in edge type 135 degree—category 2. In yet another example, the SC block 206 discards a deblocked pixel if the SC block 206 is not able to categorize a deblocked pixel in any of these categories. The SC block 206 counts a number of deblocked pixels in each category of the plurality of band categories and the plurality of edge categories. The SC block 206 estimates an error in each category from a difference between a deblocked pixel of the set of deblocked pixels 202 and corresponding original pixel of the set of original pixels 204.

The RDO block 208 receives the estimated error in each category and the count of the number of deblocked pixels in each category from the SC block 206. The RDO block 208 determines a sign of the estimated error in each category. The sign is a positive sign or a negative sign. The RDO block 208 determines a set of candidate offsets for each category. A value of a candidate offset of the set of candidate offsets is between a maximum candidate offset and a minimum candidate offset. In an example, when a video input processed by the SAO encoder 200 is an 8 bit input, the set of candidate offsets are integers from 0 to +7. In another example, when the video input processed by the SAO encoder 200 is a 10 bit input, the set of candidate offsets are integers from 0 to +31.

The RDO block 208 estimates a rate distortion (RD) cost for each candidate offset of the set of candidate offsets determined in each category. The RDO block 208 estimates the RD cost associated with each candidate offset using the count of the number of deblocked pixels in the category and an absolute value of the estimated error in that category. The RDO block 208 also uses a bitrate data from a look-up table stored in the SAO encoder 200 for estimating the RD cost associated with each candidate offset.

In one example, when the sign of the estimated error in a category is a positive sign, the set of candidate offsets are 0, 1, 2 till 7. Thus, the RDO block 208 estimates an RD cost for each of these candidate offsets. The RDO block 208 determines a minimum RD cost of the estimated RD costs for each category. In the above example, when there are 48 categories, the RDO block 208 determines a minimum RD cost for each of these 48 categories. The RDO block 208 also maintains a record of the candidate offset for which the minimum RD cost is obtained for a category. For example, when the set of candidate offsets are 0, 1, 2 till 7 for a category, the RDO block 208 estimates an RD cost for each of these candidate offset. Now, if for a candidate offset 2, the RD cost obtained is minimum, the RDO block 208 provides this minimum RD cost and the corresponding candidate offset (i.e. candidate offset 2) to the SAO type block 210.

In addition, the RDO block 208 modifies a sign of the corresponding candidate offset, for which the minimum RD cost is obtained, based on the sign of the estimated error in each category. For example, when a sign of the estimated error in a category is negative, the RDO block 208 changes a sign of the corresponding candidate offset to negative for which the minimum RD cost is obtained for that category.

The SAO type block 210 receives the minimum RD cost and the corresponding candidate offset for each category from the RDO block 208. The SAO type block 210 generates a set of band SAO types such that each band SAO type of the set of band SAO types includes a set of band categories. Thus, the SAO type block 210 combines a set of band categories to generate a band SAO type. For example, the SAO type block 210 combines a first four categories of the plurality of band categories to generate a first SAO type and the SAO type block 210 combines a next four categories of the plurality of band categories to generate a second SAO type.

Similarly, the SAO type block 210 generates a set of edge SAO types such that each edge SAO type of the set of edge SAO types comprises a set of edge categories. For example, the SAO type block 210 combines a set of edge categories of the plurality of edge categories to generate an edge SAO type. The SAO type block 210 estimates a band cost associated with each band SAO type. The band cost associated with a band SAO type is estimated by summing the minimum RD cost associated with each category that is combined to form the band SAO type. In one example, a set of band categories (B0, B1, B2 and B3) are combined to form a first band SAO type and a minimum RD cost for the respective band categories is 2, 5, 7 and 4. The band cost associated with the first band SAO type is 18 (2+5+7+4=18).

The SAO type block 210 determines a minimum band cost of the estimated band costs. The SAO type block 210 maintains a record of a set of band categories combined to form the band SAO type for which the minimum band cost is obtained and the corresponding candidate offsets associated with each band category of the set of band categories. The SAO type block 210 provides the minimum band cost, the corresponding SAO type along with the corresponding candidate offsets associated with each band category of the set of band categories to the decision block 216.

Similarly, the SAO type block 210 estimates an edge cost associated with each edge SAO type. The edge cost associated with an edge SAO type is estimated by summing the minimum RD cost associated with each edge category combined to form the edge SAO type. The SAO type block 210 provides the edge cost associated with each edge SAO type and corresponding candidate offsets associated with each edge category combined to form the edge SAO type, to the decision block 216.

Table 1 illustrates the operation of the SC block 206 and the RDO block 208.

TABLE 1

| | SC block | | | RDO block | | Corresponding |
|---|---|---|---|---|---|---|
| Category | Deblocked Pixel Count | Error | Candidate Offsets | RD cost | Minimum RD cost | candidate offset |
| B0 | 23 | 178 | 0 to +7 | 16, −317, −588, −829, −1024, −1157, −1260, −1317 | −1317 | 7 |
| B1 | 64 | 151 | 0 to +7 | 16, −222, −316, −298, −152, 138, 540, 1070 | −316 | 2 |
| B2 | 4 | 33 | 0 to +7 | 16, −46, −84, −130, −168, −182, −204, −218 | −218 | 7 |
| B3 | 27 | 187 | 0 to +7 | 16, −331, −608, −847, −1032, −1147, −1224, −1247 | −1247 | 7 |
| B4 | 7 | −21 | 0 to +7 | 16, −19, −24, −31, −24, 13, 48, 97 | −31 | −3 |
| E0 | 64 | 558 | 0 to +7 | 16, −1036, −1944, −2740, −3408, −3932, −4344, −46 | −4628 | 7 |
| E1 | 43 | 124 | 0 to +7 | 16, −189, −292, −325, −272, −117, 108, 419 | −325 | 3 |
| E2 | 56 | −208 | 0 to +7 | 16, −344, −576, −712, −736, −632, −432, −120 | −736 | −4 |
| E3 | 4 | −23 | 0 to +7 | 16, −26, −44, −70, −88, −82, −84, −78 | −88 | −4 |

In table 1, B0-B4 are band categories of the plurality of band categories and E0-E3 are edge categories of the plurality of edge categories. The SC block 206 counts the number of deblocked pixels in each category and estimates an error in each category as represented in column 'Deblocked pixel count' and 'Error' respectively.

The RDO block 208 determines the set of candidate offsets. The RDO block 208 estimates a RD cost associated with each candidate offset as illustrated in column 'RD cost'. The RDO block 208 determines the minimum RD cost of the estimated RD costs for each category. For example, as illustrated in Table 1, the minimum RD cost for band category B0 is −1317 and for edge category E2 is −736. The RDO block 208 modifies a sign of the corresponding candidate offset for which the minimum RD cost is obtained for a given category. For example, for band category B4, a minimum RD cost is obtained for offset 3, the RDO block 208 modifies the sign of the offset and the corresponding candidate offset for band category B4 is −3.

Table 2 illustrates the operation of the SAO type block 210.

TABLE 2

| | SAO Type Block | | | | |
|---|---|---|---|---|---|
| Band SAO Type | Band Categories | Band Cost | Minimum Band cost | Corresponding categories | Corresponding candidate offsets |
| BO0 | B0, B1, B2 and B3 | 1317 − 316 − 218 − 1247 = −3098 | −3098 | B0, B1, B2 and B3 | 7, 2, 7, 7 |
| BO1 | B1, B2, B3 and B4 | −316 − 218 − 1247 − 31 = −1812 | | | |
| Edge SAO Type | | Edge Cost | | | |
| EO | E0, E1, E2 and E3 | −4628 − 325 − 736 − 88 = −5777 | | | |

Table 2 illustrates Band SAO type BO0 and BO1. The SAO type block 210 generates Edge SAO type EO. The SAO type block 210 estimates the band cost associated with each band SAO types by summing the minimum RD cost associated with each band category combined to form the band SAO type. For example, the band cost for band SAO type BO0 is estimated by summing the minimum RD cost associated with B0, B1, B2 and B3. Similarly, the SAO type block 210 estimates the edge cost associated with each edge SAO type.

The SAO type block 210 determines a minimum band cost of the estimated band costs. As illustrated in column 'Minimum Band Cost' the SAO type block 210 determines that the minimum band cost is −3098 of all the estimated band costs. The SAO type block 210 maintains a record of the corresponding categories (B0, B1, B2 and B3) for which the minimum band cost is obtained and also the corresponding candidate offsets (7, 2, 7, 7) for these categories (B0, B1, B2 and B3) respectively.

The SAO type block 210 provides the edge cost associated with each edge SAO type and corresponding candidate offsets associated with each edge category combined to form the edge SAO type, to the decision block 216. Thus, the SAO type block 210 provides edge SAO type EO to the decision block 216 along with the estimated edge costs. The SAO type block 210 also maintains a record of the corresponding candidate offsets for each of the edge categories combined to form the edge SAO type.

The merge mode block 212 receives the count of the number of deblocked pixels in each category and the estimated error in each category. The merge mode block 212 also receives a set of parameters 214. The set of parameters 214 includes a final left SAO type associated with a left LCU. The left LCU is adjacent to the current LCU and spatially positioned on left side of the current LCU. The merge mode block 212 also receives final offsets corresponding to the final left SAO type associated with the left LCU. The merge mode block 212 estimates a left merge cost associated with the current LCU from the final offsets associated with the left LCU.

The set of parameters 214 also includes a final top SAO type associated with a top LCU. The top LCU is adjacent to the current LCU and spatially positioned on top of the current LCU. The merge mode block 212 also receives final offsets corresponding to the final top SAO type associated with the top LCU. The merge mode block 212 estimates a top merge cost associated with the current LCU from the final offsets associated with the top LCU.

The current LCU includes the luma component and the chroma component. The chroma component further includes the Cb component and the Cr component.

When the deblocked pixels 202 corresponds to the luma component of the current LCU, the minimum band cost is a luma minimum band cost and the edge cost associated with each edge SAO type is a luma edge cost. The candidate offsets corresponding to the minimum band cost are candidate offsets corresponding to the luma minimum band cost. The candidate offsets associated with each edge category combined to form the edge SAO type are candidate offsets corresponding to each luma edge cost.

Also, when the deblocked pixels 202 corresponds to the luma component of the current LCU, the left merge cost is a luma left merge cost and the top merge cost is a luma top merge cost.

When the deblocked pixels 202 corresponds to the chroma component of the current LCU, the minimum band cost is a chroma minimum band cost and the edge cost associated with each edge SAO type is a chroma edge cost. The candidate offsets corresponding to the minimum band cost are candidate offsets corresponding to the chroma minimum band cost. The candidate offsets associated with each edge category combined to form the edge SAO type are candidate offsets corresponding to each chroma edge cost.

Also, when the deblocked pixels 202 corresponds to the chroma component of the current LCU, the left merge cost is a chroma left merge cost and the top merge cost is a chroma top merge cost. In addition, each of the final left SAO type and the final top type includes a final luma SAO type and a final chroma SAO type.

In one embodiment, the SAO encoder 200 is first provided with deblocked pixels 202 corresponding to the luma component of the current LCU followed by deblocked pixels 202 corresponding to the Cb component and in the end the SAO encoder 200 is provided the deblocked pixels 202 corresponding to the Cr component. The SC block 206, the RDO block 208, the SAO type block 210 and the merge mode block 212 processes these deblocked pixels 202 in a serial fashion. Thus, all these blocks process the deblocked pixels corresponding to the luma component followed by the deblocked pixels corresponding to the chroma component. This is also enabled by the functionality of the decision block 216 as described later in the description.

In an embodiment, a data generated by the SAO type block 210 and the merge mode block 212 are stored in a buffer in the SAO encoder 200. In another embodiment, data generated by the SAO type block 210 and the merge mode block 212 are stored in a buffer in the decision block 216.

The decision block 216 receives the following (but not limited to) from the merge mode block 212; the luma left merge cost, the chroma left merge cost, the luma top merge cost, the chroma top merge cost, final offsets corresponding to the final left SAO type and the final offsets corresponding to the final top SAO type.

The decision block 216 receives the following (but not limited to) from the SAO type block 210; the luma minimum band cost, the luma edge cost associated with each edge SAO type, the chroma minimum band cost, the chroma edge cost associated with each edge SAO type and the candidate offsets corresponding to each of the luma minimum band cost, the luma edge cost, the chroma minimum band cost and the chroma edge cost.

The decision block 216 generates an output 218 based on inputs received from the SAO type block 210 and the merge mode block 212. The output 218 is a set of final offsets corresponding to the current LCU. The operation of the decision block 216 is explained later in the description in connection with FIG. 5.

Figure 3A:
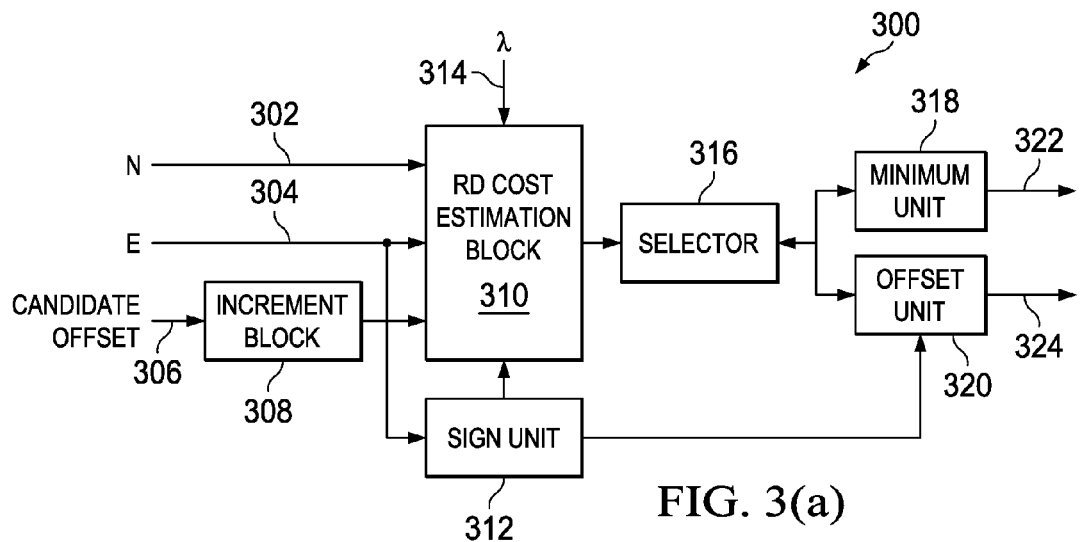
FIG. 3(a) illustrates a block diagram of a RDO (rate distortion optimization) block, according to an embodiment.

FIG. 3(a) illustrates a block diagram of a RDO (rate distortion optimization) block 300, according to an embodiment. The RDO block 300 is similar in connection and operation to the RDO block 208 illustrated in FIG. 2. The RDO block 300 includes an RD (rate distortion) cost estimation block 310. The RD cost estimation block 310 receives a count of a number of deblocked pixels (N) 302 in each category and an estimated error (E) 304 in each category. An increment block 308 receives a candidate offset 306 and the increment block 308 is coupled to the RD cost estimation block 310. The RD cost estimation block 310 also receives a constant ($\lambda$) 314. In one version, the constant ($\lambda$) 314 is predefined by a user. In another version, the constant ($\lambda$) 314 is selected based on parameters of a video encoder. The RD cost estimation block 310 is also coupled to the sign unit 312.

A selector 316 is coupled to the RD cost estimation block 310. A minimum unit 318 and an offset unit 320 are coupled to the selector 316. The minimum unit 318 generates a minimum RD cost 322 and the offset unit 320 generates a corresponding offset 324. A sign unit 312 receives the estimated error (E) 304 and is coupled to the offset unit 320. The RDO block 300 may include one or more additional components known to those skilled in the relevant art and are not discussed here for simplicity of the description.

The operation of the RDO block 300 illustrated in FIG. 3(a) is explained now. For a category, the RD cost estimation block 310 receives the count of the number of deblocked pixels (N) 302 in the category and the estimated error (E) 304 in that category. A value of the candidate offset 306 is between a maximum candidate offset and a minimum candidate offset. The RDO block 300 determines a set of candidate offsets for the category. In an example, the set of candidate offsets are integers from 0 to +7.

The RD cost estimation block 310 estimates a rate distortion (RD) cost for each candidate offset of the set of candidate offsets determined for each category. In one example, the candidate offset 306 has an initial value of 0. The increment block 308 increments the value of the candidate offset 306 by a defined integer. In an example, the increment block 308 increments the value of the candidate offset 306 by one. Thus, when the candidate offset 306 has an initial value of 0, an output of the increment block 308 is an integer value from 0 to +7.

The RD cost estimation block 310 is explained later in the description in connection with FIG. 3(b). For a first candidate offset 306, the RD cost estimation block 310 estimates a first RD cost using the count of the number of deblocked pixels (N) 302 in a category, the estimated error (E) 304 in that category and the constant ($\lambda$) 314. The first RD cost is received by the selector 316. The minimum unit 318 stores a value of the first RD cost and the offset unit 320 stores corresponding candidate offset for which the first RD cost is obtained. A second candidate offset 306 generated by the increment block 308, in one example, is +1. The RD cost estimation block 310 estimates a second RD cost corresponding to the second candidate offset 306 using the count of the number of deblocked pixels (N) 302 in the category, the estimated error (E) 304 in that category and the constant ($\lambda$) 314. The second RD cost is received by the selector 316. The selector 316 compares the first RD cost and the second RD cost and stores a minimum of the first RD cost and the second RD cost in the minimum unit 318 and a corresponding candidate offset is stored in the offset unit 320.

In one example, when the first RD cost is less than the second RD cost, the selector 316 stores the first RD cost in the minimum unit 318 and the corresponding candidate offset is stored in the offset unit 320. The process is repeated for all candidate offsets of the set of candidate offsets determined for the category. It is to be noted that a candidate offset of the set of candidate offsets is between a maximum candidate offset and a minimum candidate offset. In an embodiment, a value of the maximum candidate offset and the minimum candidate offset are predefined for the RDO block 300.

When a minimum RD cost of the estimated RD costs is determined for a category, a candidate offset corresponding to the minimum RD cost is stored in the offset unit 320. The sign unit 312 receives a sign of the error in each category. The sign unit 312 modifies a sign of the candidate offset stored in the offset unit 320. For example, when a sign of the estimated error (E) 304 in a category is negative, the sign unit 312 changes a sign of the corresponding candidate offset (stored in the offset unit 320) to negative for which the minimum RD cost is obtained. The minimum unit 318 generates the minimum RD cost 322 and the offset unit 320 generates the corresponding offset 324 for a given category.

In one version, the RDO block 300 checks a sign of the candidate offset 324 generated for the given category. If the sign of the candidate offset 324 is non-compliant with the HEVC standard, the RDO block 300 generates a predefined candidate offset and the corresponding minimum RD cost is estimated for the predefined candidate offset. For example, when the sign of the candidate offset 324 is non-compliant with the HEVC standard, the RDO block 300 generates 0 as candidate offset and a corresponding minimum RD cost.

In one example, the RDO block 300 is used to estimate a minimum RD cost 322 for each category of the plurality of categories. In another example, a plurality of RDO blocks are used in the SAO encoder (for example SAO encoder 200) and an RDO block of the plurality of RDO blocks is used to estimate a minimum RD cost 322 for a category. In yet another example, a number of RDO block 300 in the SAO encoder is equal to a total number of band categories and edge categories and each RDO block 300 estimates a minimum RD cost 322 for a category.

Figure 3B:
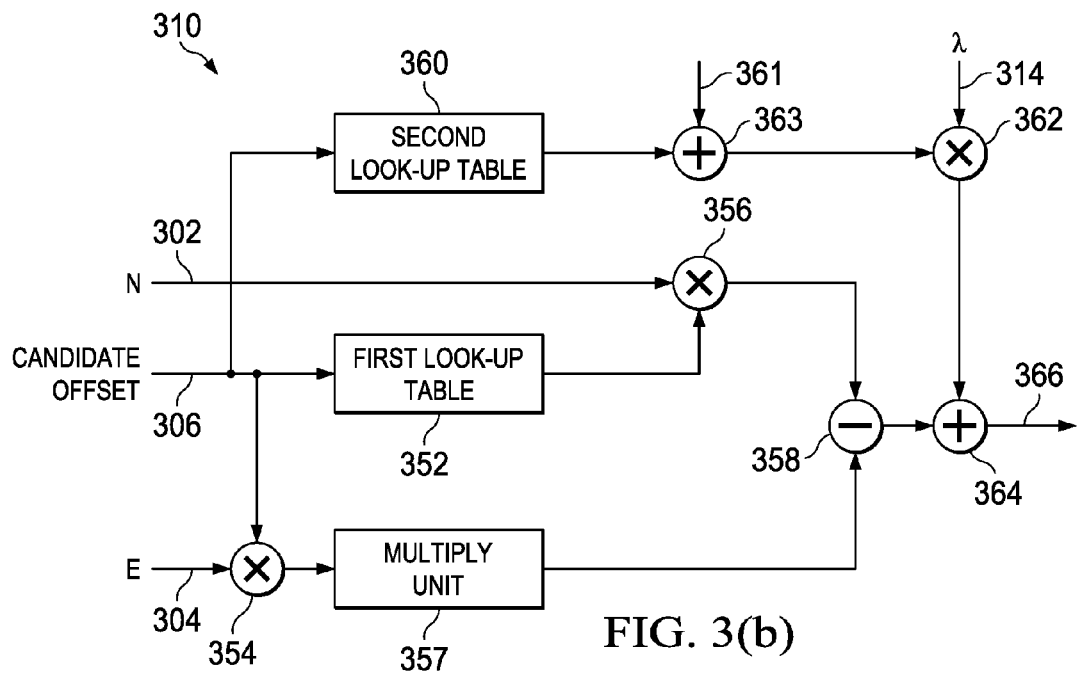
FIG. 3(b) illustrates a block diagram of an RD (rate distortion) cost estimation block, according to an embodiment.

FIG. 3(b) illustrates a block diagram of an RD (rate distortion) cost estimation block 310, according to an embodiment. The RD cost estimation block 310 receives the count of a number of deblocked pixels (N) 302 in each category, the estimated error (E) 304 in each category, the candidate offset 306 and the constant ($\lambda$) 314. A first look-up table 352 and a second look-up table 360 receive the candidate offset 306. A first multiplier 354 receives the candidate offset 306 and the estimated error (E) 304. A second multiplier 356 is coupled to the first look-up table 352 and receives the count of the number of deblocked pixels (N) 302.

A multiply unit 357 is coupled to the first multiplier 354. A subtractor 358 is coupled to the second multiplier 356 and the multiply unit 357. A first adder 363 is coupled to the second look-up table 360 and receives a sign input 361. A third multiplier 362 is coupled to the first adder 363 and receives the constant ($\lambda$) 314. In one version, the constant ($\lambda$) 314 is predefined by a user. In another version, the constant ($\lambda$) 314 is selected based on parameters of a video encoder. A second adder 364 is coupled to the third multiplier 362 and the subtractor 358. The second adder 364 generates the RD cost 366. The RD cost estimation block 310 may include one or more additional components known to those skilled in the relevant art and are not discussed here for simplicity of the description.

The operation of the RD cost estimation block 310 illustrated in FIG. 3(b) is explained now. The RD cost estimation block 310 estimates an RD cost for a category using the count of number of deblocked pixels (N) 302 in the category, the estimated error (E) 304 in that category and the constant ($\lambda$) 314. According to an embodiment, the RD cost (J) is defined as:

$$J = ((N \times O^2 \times |E| \times O) + \lambda R) \qquad (1)$$

where, O is the candidate offset 306 and R is a bitrate data.

The first look-up table 352 stores a value of $O^2$ corresponding to the candidate offset 306. The second look-up table 360 stores a value of the bitrate data (R) corresponding to the candidate offset 306. The bitrate data (R) represents a number of bits required by an entropy coder (for example, entropy coder 108 illustrated in FIG. 1) to transmit a symbol generated by a video encoder (for example, video encoder 100 illustrated in FIG. 1).

The first multiplier 354 multiplies an absolute value of the estimated error (E) 304 and the candidate offset 306. The second multiplier 356 multiplies the count of the number of deblocked pixels (N) 302 and $O^2$ received from the first look-up table 352. The multiply unit 357 multiply a set of bits received from the first multiplier 354. The subtractor 358 subtracts an output of the multiply unit 357 from an output of the second multiplier 356.

The first adder 363 receives the sign input 361. The sign input 361 indicates the sign of the estimated error (E) 304 for a category. The first adder 363, in one example, increments the bitrate data (R) when a sign of the estimated error (E) 304 for a category is negative and does not alter the bitrate data (R) when a sign of the estimated error (E) 304 for a category is positive. The third multiplier 362 multiplies the bitrate data (R) received from the first adder 363 and the constant ($\lambda$) 314. An output of the third multiplier 362 is added to an output of the subtractor 358 by the second adder 364 to generate the RD cost (J) which is defined by equation 1. In an example embodiment, the RD cost (J) is estimated using equation 1 (irrespective of the components illustrated in FIG. 3(b)), and wherein the bitrate data (R) is received from the second look-up table 360.

In an embodiment, for a given category, multiple RD cost estimation blocks are utilized and each RD cost estimation block is used to estimate RD cost associated with an offset of the set of offsets determined for the given category. In another embodiment, the RD cost estimation block 310 is used to estimate RD cost associated with each candidate offset of the set of candidate offsets for the given category.

Figure 4A:
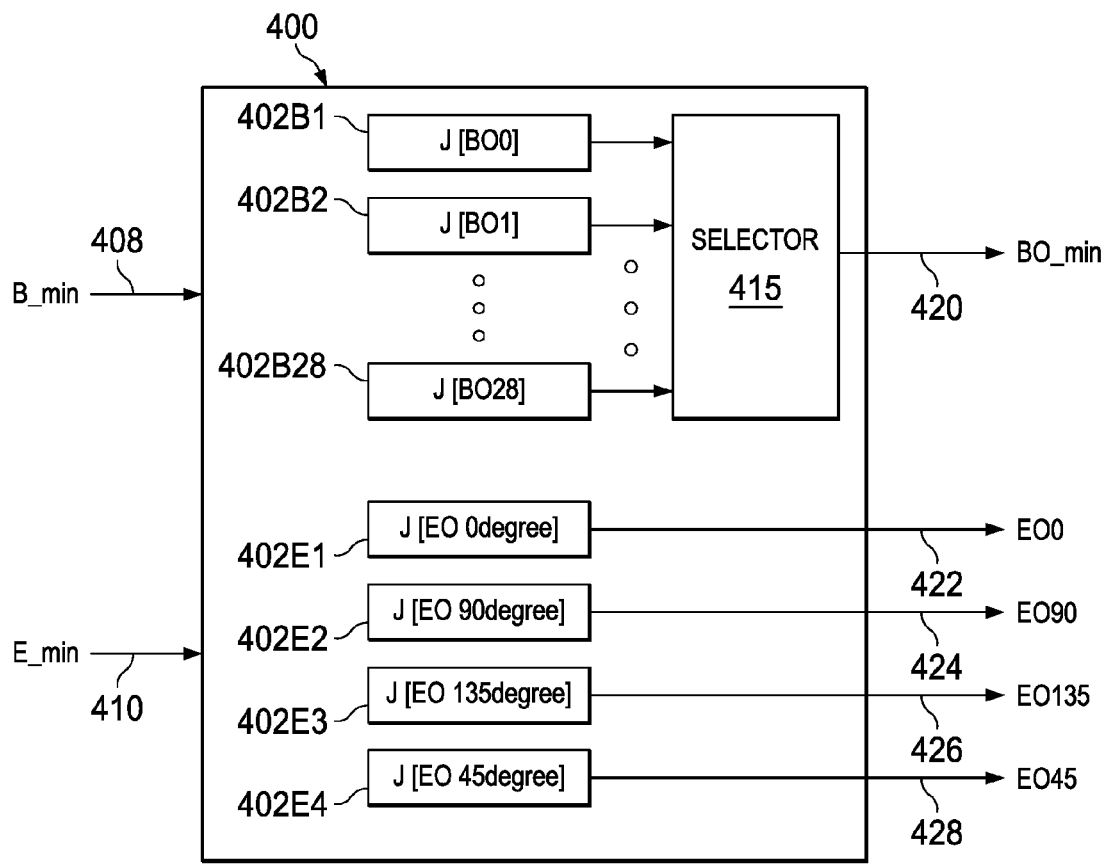
FIG. 4(a) illustrates a block diagram of a SAO (sample adaptive offset) type block, according to an embodiment.

FIG. 4(a) illustrates a block diagram of a SAO (sample adaptive offset) type block 400, according to an embodiment. The SAO type block 400 is similar in connection and operation to the SAO type block 210 illustrated in FIG. 2. The SAO type block 400 receives a minimum RD cost and the corresponding offset for each category. The SAO type block 400 is explained using 32 band categories and 16 edge categories. The specifically disclosed number of band categories and edge categories is provided to explain the logical flow and are understood not to limit the scope of the present disclosure.

The SAO type block 400 generates a set of band SAO types such the each band SAO type of the set of band SAO types includes a set of band categories. In one example, when the 32 band categories are B0, B1, B2 till B31, the set of band SAO types generated by the SAO type block 400 are BO0, BO1, BO2 till BO28, where BO is a start band of band SAO type. For example, the band categories B0, B1, B2 and B3 are combined to form band SAO type BO0 and B0 is a start band of band SAO type BO0. Similarly, the band categories B1, B2, B3 and B4 are combined to form band SAO type BO1 and B1 is the start band of SAO type BO1. The set of categories combined to form a SAO type is exemplary and it is understood that different combinations of categories are apparent and well within the spirit and scope of the disclosure The SAO type block 400 generates a set of edge SAO types such that each edge SAO type of the set of edge SAO type includes a set of edge categories. The four edge types are 0 degree, 90 degree, 135 degree and 45 degree. Each of the four edge type is further sub-divided into four edge categories. In another example, the set of edge SAO types generated by the SAO type block 400 are EO 0 degrees, EO 90 degrees, EO 135 degrees and EO 45 degrees. The four edge categories corresponding to the edge type 0 degrees are combined to form edge SAO type EO 0 degrees. Similarly, the four edge categories corresponding to the edge type 90 degrees are combined to form edge SAO type EO 90 degrees.

The SAO type block 400 receives the minimum RD cost corresponding to each band category (B_Min) 408 and the minimum RD cost corresponding to each edge category (E_min) 410. The SAO type block 400 includes multiple cost estimation modules such as 402B1, 402B2 till 402B28, 402E1, 402E2, 402E3 and 402E4. A cost estimation module estimates a band cost associated with a band SAO type when a minimum RD cost associated with each band forming the band SAO type is provided to the cost estimation module. The cost estimation module also estimates an edge cost associated with an edge SAO type when a minimum RD cost associated with each edge forming the edge SAO type is provided to the cost estimation module.

The cost estimation module is explained later in the description in connection with FIG. 4(b). The cost estimation modules 402B1, 402B2 till 402B28 estimates a band cost associated with band SAO types BO0, BO1 till BO28 respectively. Similarly, the cost estimation modules 402E1, 402E2, 402E3 and 402E4 estimates an edge cost associated with edge SAO types EO 0 degrees, EO 90 degrees, EO 135 degrees and EO 45 degrees respectively.

The SAO type block 400 includes a selector 415. The selector 415 is coupled to the cost estimation modules 402B1, 402B2 till 402B28. The selector 415 receives the band cost associated with band SAO types BO0, BO1 till BO28. The selector 415 determines a minimum band cost of the estimated band costs associated with band SAO types BO0, BO1 till BO28. The SAO type block 400 generates a BO_min output 420. The BO_min output 420 includes the minimum band cost, a set of band categories combined to form the band SAO type for which the minimum band cost is obtained and corresponding candidate offsets associated with each band category of the set of band categories.

For example, when a band cost estimated for band SAO type BO0 is minimum of all the estimated band costs for band SAO types BO0, BO1 till BO28, the minimum band cost is equal to the band cost associated with the band SAO type BO0. The SAO type block 400 generates the BO_min output 420 which includes the minimum band cost i.e. band cost associated with the band SAO type BO0, a set of band categories combined to form the band SAO type BO0 i.e. B0, B1, B2 and B3, and the candidate offsets corresponding to B0, B1, B2 and B3.

The SAO type block 400 also generates EO0 output 422 that includes the edge cost associated with edge SAO types EO 0 degrees and the corresponding candidate offsets associated with each edge category combined to form the edge SAO type EO 0 degrees. The SAO type block 400 generates EO90 output 424 that includes the edge cost associated with edge SAO types EO 90 degrees and the corresponding candidate offsets associated with each edge category combined to form the edge SAO type EO 90 degrees.

The SAO type block 400 also generates EO135 output 426 that includes the edge cost associated with edge SAO types EO 135 degrees and the corresponding candidate offsets associated with each edge category combined to form the edge SAO type EO 135 degrees. The SAO type block 400 generates EO45 output 428 that includes the edge cost associated with edge SAO types EO 45 degrees and the corresponding candidate offsets associated with each edge category combined to form the edge SAO type EO 45 degrees.

Figure 4B:
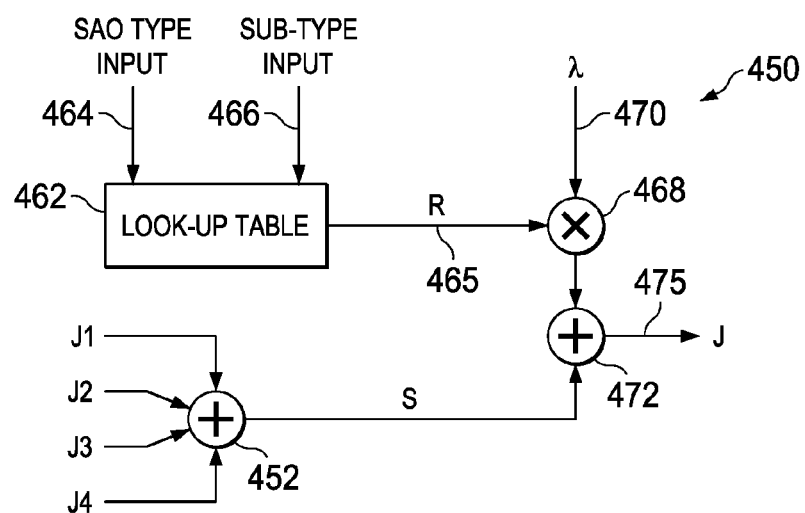
FIG. 4(b) illustrates a block diagram of a cost estimation module, according to an embodiment.

FIG. 4(b) illustrates a block diagram of a cost estimation module 450, according to an embodiment. The cost estimation module 450 is similar to at least one of the cost estimation modules 402B1, 402B2 till 402B28, 402E1, 402E2, 402E3 and 402E4 in connections and operation. The cost estimation module 450 receives four inputs J1, J2, J3 and J4. A first summer 452 receives the four inputs J1, J2, J3 and J4. A look-up table 462 receives a SAO type input 464 and a sub-type input 466 and generates a bitrate data (R) 465. A multiplier 468 receives the bitrate date (R) 465 and a constant ($\lambda$) 470. In one version, the constant ($\lambda$) 470 is predefined by a user. In another version, the constant ($\lambda$) 470 is selected based on parameters of a video encoder. A second summer 472 is coupled to the first summer 452 and the multiplier 468. The second summer 472 generates an output (J) 475. The cost estimation module 450 may include one or more additional components known to those skilled in the relevant art and are not discussed here for simplicity of the description.

The operation of the cost estimation module 450 illustrated in FIG. 4(b) is explained now. In one example, the four inputs J1, J2, J3 and J4 are a minimum RD cost associated with each band forming the band SAO type. In another example, the four inputs J1, J2, J3 and J4 are a minimum RD cost associated with each edge forming the edge SAO type.

For example, the cost estimation module 450 receives a minimum cost RD cost associated with B0, B1, B2 and B3 that form the band SAO type BO0. In a further example, the cost estimation module 450 receives a minimum RD cost associated with the four edge categories corresponding to the edge type 0 degrees that form the edge SAO type EO 0 degrees. The first summer 452 sums the four inputs J1, J2, J3 and J4 to generate an output (S).

The SAO type input 464 indicates if the four inputs J1, J2, J3 and J4 belong to band categories or edge categories. The sub-type input 466 indicates a set of band categories that form a band SAO type or a set of edge categories that form an edge SAO type. The look-up table 462 generates the bitrate data (R) 465 based on the SAO type input 464 and the sub-type input 466. The multiplier 468 multiplies the bitrate data (R) 465 and the constant (k) 470.

The second summer 472 sums an output of the multiplier 468 and the output (S) of the first summer 452. The output (J) 475 generated by the second summer 472 is defined as:

$$J = S + \lambda R \quad (2)$$

where, S represents a sum of the minimum RD cost corresponding to a SAO type.

In one example, the output (J) 475 is the band cost associated with a band SAO type when the four inputs J1, J2, J3 and J4 are a minimum RD cost associated with each band forming the band SAO type. In another example, the output (J) 475 is the edge cost associated with an edge SAO type when the four inputs J1, J2, J3 and J4 are a minimum RD cost associated with each edge forming the edge SAO type.

Figure 5:
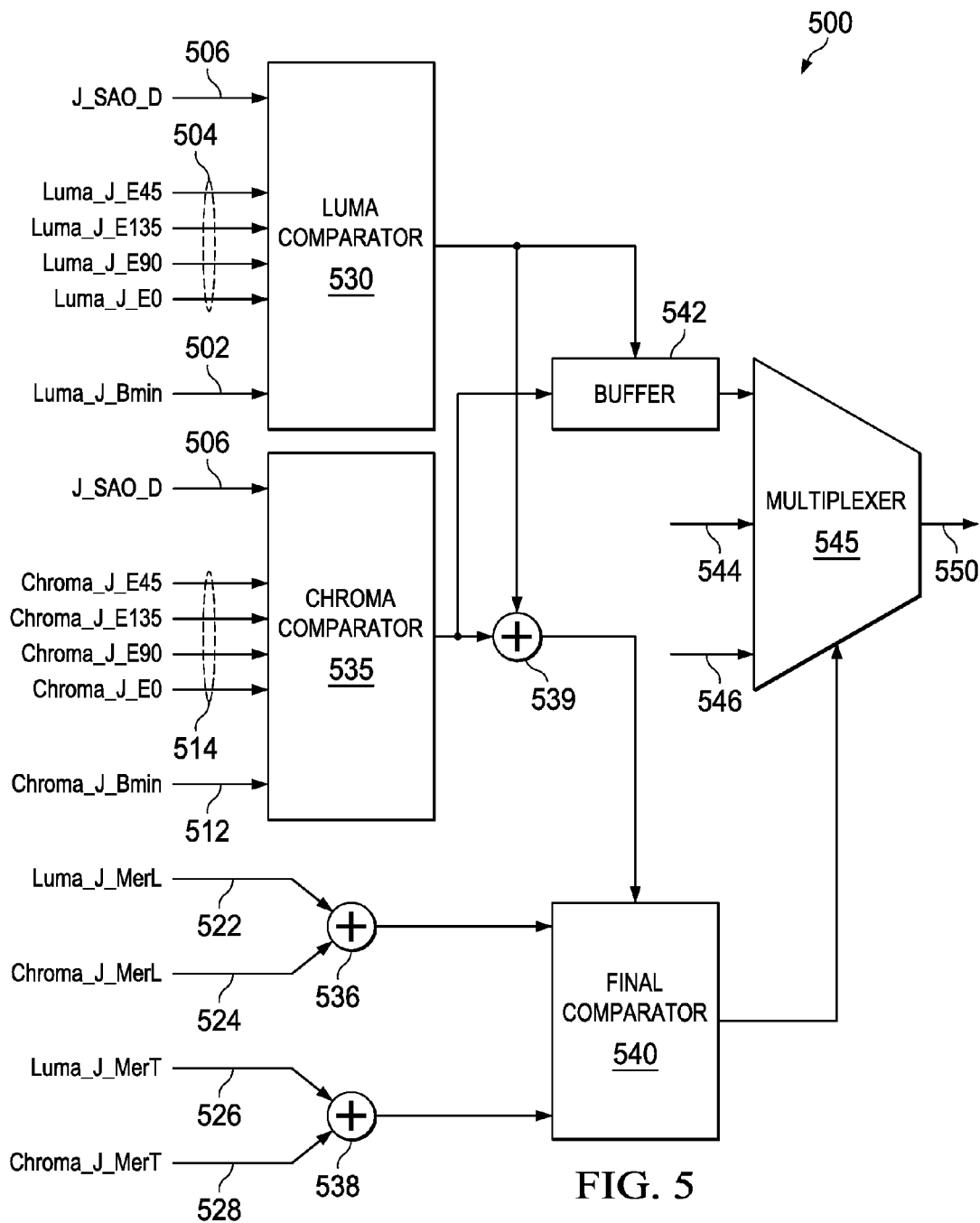
FIG. 5 illustrates a block diagram of a decision block, according to an embodiment.

FIG. 5 illustrates a block diagram of a decision block 500, according to an embodiment. The decision block 500 is similar in connection and operation to the decision block 216 (illustrated in FIG. 2) in connections and operation. The decision block 500 is explained using 32 band categories and 16 edge categories. The specifically disclosed number of band categories and edge categories is provided to explain the logical flow and are understood not to limit the scope of the present disclosure.

A luma comparator 530 in the decision block 500 receives a luma minimum band cost (Luma_J_Bmin) 502, a luma edge cost associated with each edge SAO type 504 and a SAO disable cost (J_SAO_D) 506. A luma edge cost associated with edge SAO type 0 degree is Luma_J_E0 and a luma edge cost associated with edge SAO type 90 degrees is Luma_J_E90. A luma edge cost associated with SAO type 135 degree is Luma_J_E135 and a luma edge cost associated with edge SAO type 45 degree is Luma_J_E45.

A chroma comparator 535 in the decision block 500 receives a chroma minimum band cost (Chroma_J_Bmin) 512, a chroma edge cost associated with each edge SAO type 514 and the SAO disable cost (J_SAO_D) 506. A chroma edge cost associated with edge SAO type 0 degree is Chroma_J_E0 and a chroma edge cost associated with edge SAO type 90 degrees is Chroma_J_E90. A chroma edge cost associated with edge SAO type 135 degree is Chroma_J_E135 and a chroma edge cost associated with edge SAO type 45 degree is Chroma_J_E45. Each of the chroma minimum band cost (Chroma_J_Bmin) 512 and the chroma edge cost associated with each edge SAO type 514 includes at least one of a Cb component and a Cr component.

The decision block 500 also receives candidate offsets corresponding to each of the luma minimum band cost (Luma_J_Bmin) 502, the luma edge cost associated with each edge SAO type 504, the chroma minimum band cost (Chroma_J_Bmin) 512 and the chroma edge cost associated with each edge SAO type 514.

A first summer 536 in the decision block 500 receives a luma left merge cost (Luma_J_MerL) 522 and a chroma left merge cost (Chroma_J_MerL) 524. A second summer 538 in the decision block 500 receives a luma top merge cost (Luma_J_MerT) 526 and a chroma top merge cost (Chroma_J_MerT) 528. Each of the chroma left merge cost (Chroma_J_MerL) 524 and the chroma top merge cost (Chroma_J_MerT) 528 includes at least one of a Cb component and a Cr component.

A third summer 539 is coupled to the luma comparator 530 and the chroma comparator 535. A final comparator 540 is coupled to the first summer 536, the second summer 538 and the third summer 539. The final comparator 540 is coupled to a multiplexer 545. The multiplexer 545 receives final offsets corresponding to the final left SAO type 544 and final offsets corresponding to the final top SAO type 546. A buffer 542 is coupled to the luma comparator 530 and the chroma comparator 535. The buffer 542 is also coupled to the multiplexer 545. The multiplexer 545 generates an output 550.

The operation of the decision block 500 illustrated in FIG. 5 is explained now. The luma comparator 530 selects a minimum of the luma minimum band cost (Luma_J_Bmin) 502, the luma edge cost associated with each edge SAO type 504 and the SAO disable cost (J_SAO_D) 506. The luma comparator 530 generates a best luma cost. The chroma comparator 535 selects a minimum of the chroma minimum band cost (Chroma_J_Bmin) 512, the chroma edge cost associated with each edge SAO type 514 and the SAO disable cost (J_SAO_D) 506. The chroma comparator 535 generates a best chroma cost. The third summer 539 adds the best luma cost and the best chroma cost to generate a joint cost.

The buffer 542 receives offsets corresponding to the best luma cost and offsets corresponding to the best chroma cost. The offsets corresponding to the best luma cost are best luma offsets and the offsets corresponding to the best chroma cost are best chroma offsets. The best luma offsets includes at least one of offsets corresponding to the SAO disable cost (J_SAO_D) 506, candidate offsets corresponding to the luma minimum band cost (Luma_J_Bmin) 502 and candidate offsets corresponding to luma edge cost associated with each edge SAO type 504.

The best chroma offsets includes at least one of the offsets corresponding to the SAO disable cost (J_SAO_D) 506, candidate offsets corresponding to the chroma minimum band cost (Chroma_J_Bmin) 512 and candidate offsets corresponding to chroma edge cost associated with each edge SAO type 514.

In one example, the offsets corresponding to the SAO disable cost (J_SAO_D) 506 have zero value. In another example, when the best luma cost is equal to the SAO disable cost (J_SAO_D) 506, no luma offsets corresponding to the current LCU are generated. Similarly, when the best chroma cost is equal to the SAO disable cost (J_SAO_D) 506, no chroma offsets corresponding to the current LCU are generated. In an additional example, when at least one of the best luma cost and the best chroma cost is equal to the SAO disable cost (J_SAO_D) 506, the SAO encoder 200 is deactivated.

The first summer 536 adds the luma left merge cost (Luma_J_MerL) 522 and the chroma left merge cost (Chroma_J_MerL) 524 to generate a joint left merge cost. The second summer 538 adds the luma top merge cost (Luma_J_MerT) 526 and the chroma top merge cost (Chroma_J_MerT) 528 to generate a joint top merge cost.

The final comparator 540 receives the joint cost, the joint left merge cost and the joint top merge cost. The final comparator 540 selects a minimum of the joint cost, the joint left merge cost and the joint top merge cost to generate a final cost.

The multiplexer 545 is controlled by the final comparator 540. When the final cost is equal to the joint left merge cost, the output 550 of the multiplexer 545 are the final offsets corresponding to the final left SAO type 544. When the final cost is equal to the joint top merge cost, the output 550 of the multiplexer 545 are the final offsets corresponding to the final top SAO type 546. When the final cost is equal to the joint cost, the output 550 of the multiplexer 545 are the best luma offsets and the best chroma offsets. The output 550 represents a final offsets corresponding to the current LCU in a SAO encoder.

The SAO encoder 200 is able to provide a best offset for each SAO type in real time. The SAO encoder 200 selects a SAO type which results in minimal distortion between the deblocked pixels 202 and the current pixels 204. The SAO encoder 200 has low complexity as all the processes such as statistics collection, parameter estimation, cost estimations are optimized and simple. Thus, the SAO encoder 200 reduces the distortion in image transmitted of the video encoder (such as video encoder 100) and thus provides a video with high quality and PSNR. In one embodiment, 0.15 mm$^2$ of silicon area is utilized to perform 4K video encoding at 60 FPS (frames per second) using the 28 nm LP process node. In another embodiment, the processes of the SAO encoder 200 are implemented on a fixed point programmable device such as DSP (digital signal processor). The SAO encoder 200 achieves bit rate reduction in HEVC. The SAO encoder 200 improves visual quality and maintains compliance with the constraints set by the HEVC standard.

Figure 6:
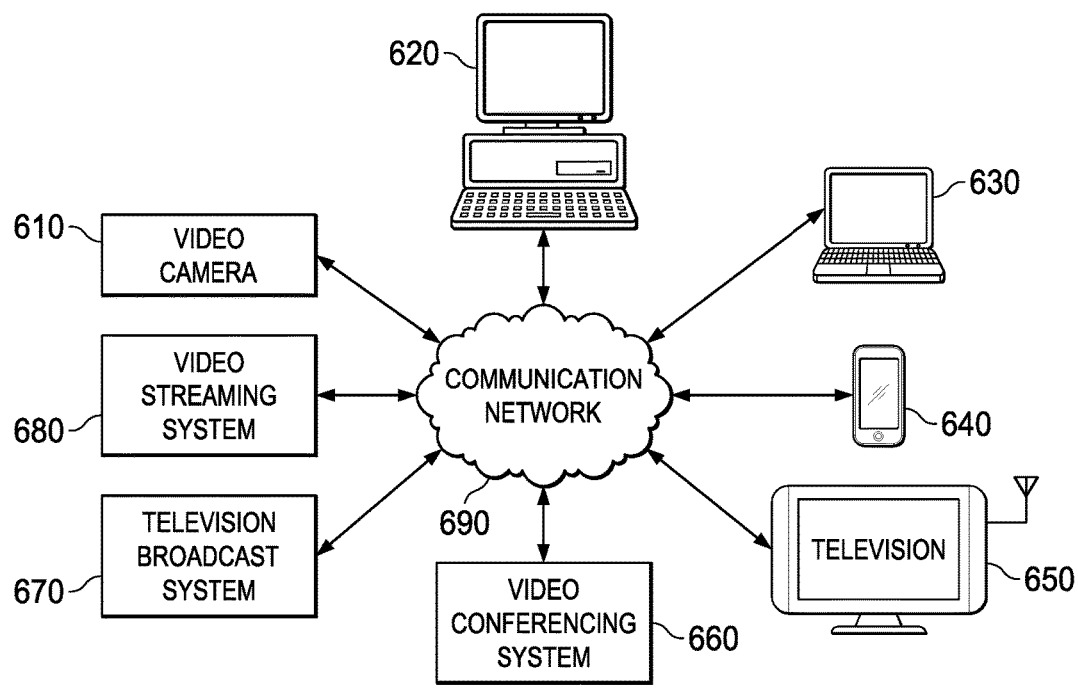
FIG. 6 is an example environment in which various aspect of the present disclosure may be implemented.

FIG. 6 is an example environment in which various aspect of the present disclosure may be implemented. As shown, the environment may comprise, for example, one or more video cameras 610, computers 620, personal digital assistants (PDA) 630, mobile devices 640, televisions 650, video conference systems 660, video streaming systems 680, TV broadcasting systems 670 and communication networks/channels 690.

The video cameras 610 are configured to take continuous pictures and generate digital video, a signal comprising sequence of image frames. The video cameras 610 are configured to process the image frames for efficient storage and/or for transmission over the communication networks/channels 690. The computers 620, PDAs 630 and the mobile devices 640 are configured to encode the video signals for transmission and to decode encoded video signals received from the communication networks/channels 690. The video streaming systems 680 is configured to encode video signal and to transmit the encoded video signals over the communication networks/channels 690 responsive to a received request and/or asynchronously. The television broadcasting systems 670 are configured to process video signals in accordance with one or more broadcast technologies and to broadcast the processed video signals over the communication networks/channels 690. The video conference systems 660 are configured to receive a video signal from one or more participating/conferencing end-terminals (not shown) and to convert or compress the video signal for broadcasting or for transmitting to other participating user terminals. The television broadcasting systems 670 are configured to receive encoded video signals from one or more different broadcasting centers (or channels), to decode each video signal and to display the decoded video signals on a display device (not shown).

As shown in FIG. 6, the devices and systems 610-680 are coupled to communication networks/channels 690. Communication networks/channels 690 supports an exchange of video signal encoded in accordance with one or more video encoding standards such as, but not limited to, H. 263, H. 264/AEC, and HEVC (H. 266), for example. Accordingly, the devices and systems 610-680 are required to process (encode and/or decode) video signals complying with such standards. The systems and devices 610-680 are implemented with one or more functional units that are configured to perform signal processing, transmitting and/or receiving of video signals from communication networks/channels 690. When each device in the described environment performs video coding or decoding, one or more embodiments described in this disclosure are used.

Figure 7:
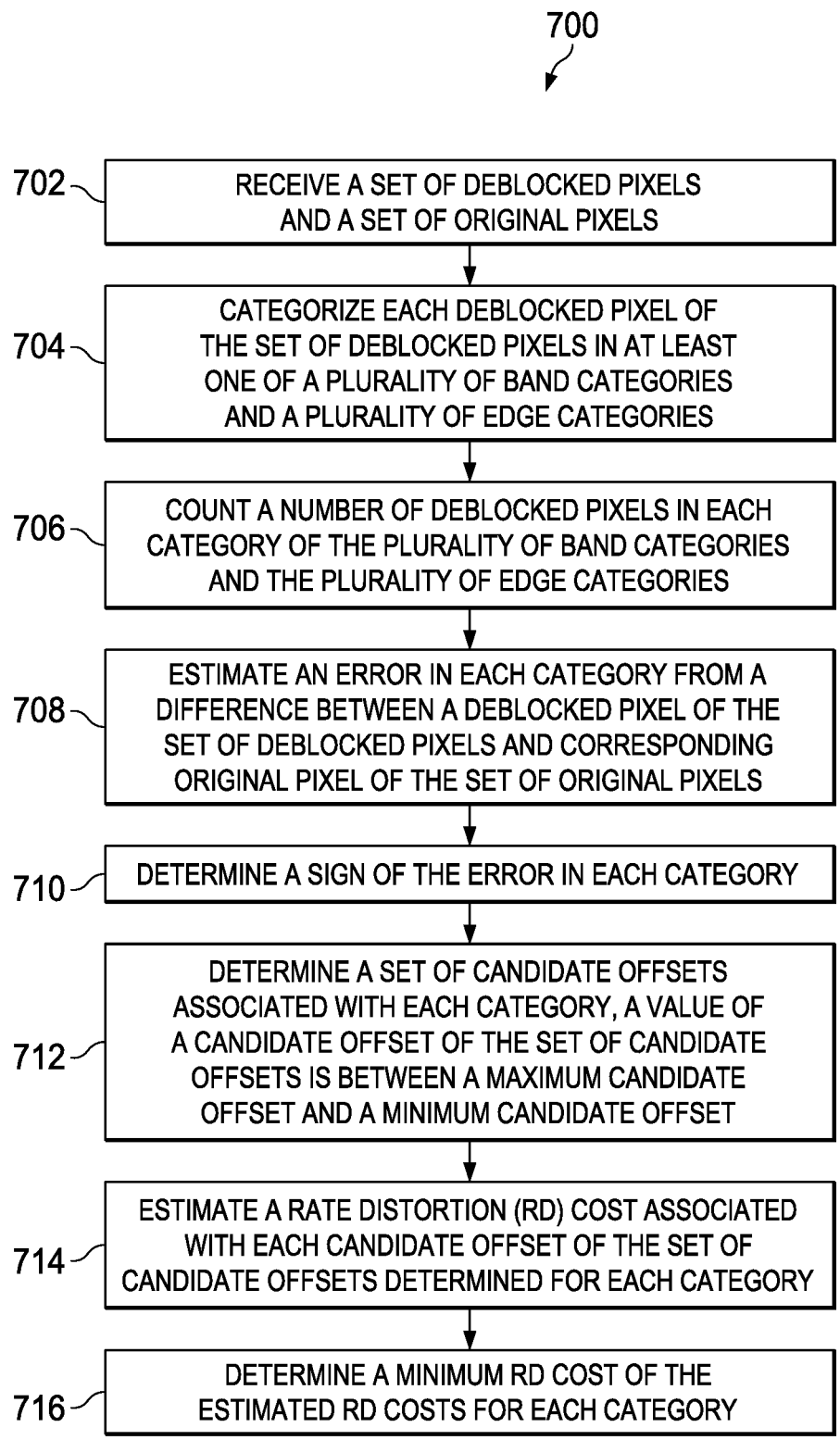
FIG. 7 illustrates a method of generating final offsets in a SAO encoder, according to an embodiment.

FIG. 7 illustrates a method 700 of generating final offsets in a SAO encoder, according to an embodiment. The method 700 depicted in the flow diagram may be executed by, for example, SAO encoder 200 explained with reference to FIG. 2. Operations of the flowchart, and combinations of operation in the flowchart, may be implemented by, for example, hardware, firmware, a processor, circuitry and/or a different device associated with the execution of software that includes one or more computer program instructions. The operations of the method 700 are described herein with help of the SAO encoder 200. However, the operations of the method 700 can be described and/or practiced by using a system other than the SAO encoder 200. The method 700 starts at step 702.

At step 702, a set of deblocked pixels and a set of original pixels are received. For example, the SC block 206 receives the set of deblocked pixels and the set of original pixels. The set of original pixels corresponds to a current LCU. The current LCU includes a luma component and a chroma component. The chroma component further includes a Cb component and a Cr component. At step 704, each deblocked pixel of the set of deblocked pixels is categorized in at least one of a plurality of band categories and a plurality of edge categories. In one example, the SAO encoder 200 includes 32 band categories and 16 edge categories.

At step 706, a number of deblocked pixels in each category of the plurality of band categories and the plurality of edge categories are counted. An error in each category is estimated from a difference between a deblocked pixel of the set of deblocked pixels and corresponding original pixel of the set of original pixels, at step 708.

At step 710, a sign of the error in each category is determined. In an example, the RDO block 208 determines a sign of the error in each category. The sign is a positive sign or a negative sign. At step 712, a set of candidate offsets associated with each category is determined. A value of a candidate offset of the set of candidate offsets is between a maximum candidate offset and a minimum candidate offset. In an example, when a video input processed by the SAO encoder 200 is an 8 bit input, the set of candidate offsets are integers from 0 to +7.

A rate distortion (RD) cost associated with each candidate offset of the set of candidate offsets determined for each category is estimated at step 714. In one version, the RD cost associated with each candidate offset is estimated using the count of the number of deblocked pixels in the category and an absolute value of the estimated error in that category. A bitrate data from a look-up table stored in the SAO encoder 200 is also used for estimating the RD cost associated with each candidate offset. At step 716, a minimum RD cost is determined of the estimated RD costs for each category. A record of the candidate offset for which the minimum RD cost is obtained for a category is also maintained. In a further example, a sign of the corresponding candidate offset, for which the minimum RD cost is obtained, is modified based on the sign of the estimated error in each category. The minimum RD cost is used to generate the final offsets for a SAO encoder (for example SAO encoder 200).

The SAO encoder 200, the RDO block 208, the SAO type block 210, the merge mode block 212 and the decision block 216 may be enabled using software and/or using transistors, logic gates, and electrical circuits (for example, integrated circuit circuitry such as ASIC circuitry). Various embodiments of the present disclosure may include one or more computer programs stored or otherwise embodied on a computer-readable medium, wherein the computer programs are configured to cause a processor or computer to perform one or more operations. A computer-readable medium storing, embodying, or encoded with a computer program, or similar language, may be embodied as a tangible data storage device storing one or more software programs that are configured to cause a processor or computer to perform one or more operations. Such operations may be, for example, any of the steps or operations described herein.

In some embodiments, the computer programs may be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), DVD (Digital Versatile Disc), BD (Blu-ray (registered trademark) Disc), and semiconductor memories (such as mask ROM, PROM (programmable ROM), EPROM (erasable PROM), flash ROM, RAM (random access memory), etc.).

Additionally, a tangible data storage device may be embodied as one or more volatile memory devices, one or more non-volatile memory devices, and/or a combination of one or more volatile memory devices and non-volatile memory devices. In some embodiments, the computer programs may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

In the foregoing discussion, the terms "connected" means at least either a direct electrical connection between the devices connected or an indirect connection through one or more passive intermediary devices. The term "circuit" means at least either a single component or a multiplicity of passive or active components, that are connected together to provide a desired function. The term "signal" means at least one current, voltage, charge, data, or other signal. Also, the terms "connected to" or "connected with" (and the like) are intended to describe either an indirect or direct electrical connection. Thus, if a first device is coupled to a second device, that connection can be through a direct electrical connection, or through an indirect electrical connection via other devices and connections.

One having ordinary skill in the art will understand that the present disclosure, as discussed above, may be practiced with steps and/or operations in a different order, and/or with hardware elements in configurations which are different than those which are disclosed. Therefore, although the disclosure has been described based upon these preferred embodiments, it should be appreciated that certain modifications, variations, and alternative constructions are apparent and well within the spirit and scope of the disclosure. In order to determine the metes and bounds of the disclosure, therefore, reference should be made to the appended claims.

What is claimed is:

1. A video encoding system comprising:
   an input receiving video input data;
   one or more processors configured to implement a sample adaptive offset (SAO) video encoder comprising:
      a statistics collection (SC) block configured to receive a set of deblocked pixels and a set of original pixels, the SC block configured to:
         categorize each deblocked pixel of the set of deblocked pixels in at least one of a plurality of band categories and a plurality of edge categories;
         count a number of deblocked pixels in each category of the plurality of band categories and the plurality of edge categories; and
         estimate an error in each category from a difference between a deblocked pixel of the set of deblocked pixels and corresponding original pixel of the set of original pixels;
      a rate distortion optimization (RDO) block coupled to the SC block, the RDO block is configured to:
         determine a sign of the error in each category;
         determine a set of candidate offsets associated with each category, a value of a candidate offset of the set of candidate offsets is between a maximum candidate offset and a minimum candidate offset;
         estimate a rate distortion (RD) cost associated with each candidate offset of the set of candidate offsets determined for each category; and
         determine a minimum RD cost of the estimated RD costs for each category;
   wherein the SAO video encoder encodes the video input data based at least partially on the minimum RD cost.

2. The video encoding system of claim 1, wherein the RDO block is configured to estimate the RD cost for each candidate offset using the count of the number of deblocked pixels in each category and an absolute value of the estimated error for each category.

3. The video encoding system of claim 1, wherein the RDO block is configured to estimate the RD cost for each candidate offset using a bitrate data from a look-up table stored in the SAO video encoder.

4. The video encoding system of claim 1, wherein the RDO block is configured to modify a sign of the corresponding candidate offset used to determine the minimum RD cost based on the sign of the error in each category.

5. The video encoding system of claim 1, wherein the SAO video encoder further comprises a SAO type block coupled to the RDO block, the SAO type block configured to:
receive the minimum RD cost and corresponding candidate offset for each category, the minimum RD cost is determined from the corresponding candidate offset;
generate a set of band SAO types such that each band SAO type of the set of band SAO types comprises a set of band categories of the plurality of band categories;
generate a set of edge SAO types such that each edge SAO type of the set of edge SAO types comprises a set of edge categories of the plurality of edge categories;
estimate a band cost associated with each band SAO type, the band cost associated with a band SAO type is estimated by summing the minimum RD cost associated with each band category combined to form the band SAO type;
estimate an edge cost associated with each edge SAO type, the edge cost associated with an edge SAO type is estimated by summing the minimum RD cost associated with each edge category combined to form the edge SAO type;
determine a minimum band cost of the estimated band costs;
provide a minimum band cost, a set of band categories combined to form the band SAO type for which the minimum band cost is obtained and corresponding candidate offsets associated with each band category of the set of band categories, to a decision block; and
provide the edge cost associated with each edge SAO type and corresponding candidate offsets associated with each edge category combined to form the edge SAO type, to the decision block.

6. The video encoding system of claim 5, wherein the SAO type block is configured to estimate the minimum band cost using the bitrate data from a look-up table stored in the SAO video encoder.

7. The video encoding system of claim 5, wherein:
when the set of deblocked pixels corresponds to a luma component of a current LCU (largest coding unit), the minimum band cost is a luma minimum band cost and the edge cost associated with each edge SAO type is a luma edge cost; and
when the set of deblocked pixels corresponds to a chroma component of the current LCU, the minimum band cost is a chroma minimum band cost and the edge cost associated with each edge SAO type is a chroma edge cost.

8. The video encoding system of claim 7, wherein:
when the set of deblocked pixels corresponds to the luma component of the current LCU, the candidate offsets corresponding to the minimum band cost are candidate offsets corresponding to the luma minimum band cost and the candidate offsets associated with each edge category combined to form the edge SAO type are candidate offsets corresponding to each luma edge cost; and when the set of deblocked pixels corresponds to the chroma component of the current LCU, the candidate offsets corresponding to the minimum band cost are candidate offsets corresponding to the chroma minimum band cost and the candidate offsets associated with each edge category combined to form the edge SAO type are candidate offsets corresponding to each chroma edge cost.

9. The video encoding system of claim 1, wherein the SAO video encoder further comprises a merge mode block coupled to the SC block and configured to:
receive the count of the number of deblocked pixels in each category and the estimated error in each category;
receive a final left SAO type associated with a left LCU;
receive final offsets corresponding to the final left SAO type associated with the left LCU;
estimate a left merge cost associated with the current LCU from the final offsets associated with the left LCU;
receive a final top SAO type associated with a top LCU;
receive final offsets corresponding to the final top SAO type associated with the top LCU; and
estimate a top merge cost associated with the current LCU from the final offsets associated with the top LCU.

10. The video encoding system of claim 9, wherein:
when the set of deblocked pixels corresponds to the luma component of the current LCU, the left merge cost is a luma left merge cost and the top merge cost is a luma top merge cost; and
when the set of deblocked pixels corresponds to the chroma component of the current LCU, the left merge cost is a chroma left merge cost and the top merge cost is a chroma top merge cost.

11. The video encoding system of claim 9, wherein each of the final left SAO type and the final top SAO type comprises a final luma SAO type and a final chroma SAO type.

12. The video encoding system of claim 1, wherein the SAO video encoder further comprises a decision block coupled to the SAO type block and the merge mode block, the decision block is configured to:
receive the luma minimum band cost, the luma edge cost associated with each edge SAO type and a SAO disable cost;
receive the chroma minimum band cost, the chroma edge cost associated with each edge SAO type and the SAO disable cost;
receive the luma left merge cost and the chroma left merge cost from the merge mode block; and
receive the luma top merge cost and the chroma top merge cost from the merge mode block.

13. The video encoding system of claim 12, wherein the decision block is configured to:
select a minimum of the luma minimum band cost, the luma edge cost associated with each edge SAO type and the SAO disable cost to generate a best luma cost;
select a minimum of the chroma minimum band cost, the chroma edge cost associated with each edge SAO type and the SAO disable cost to generate a best chroma cost;
add the best luma cost and the best chroma cost to generate a joint cost;
add the luma left merge cost and the chroma left merge cost to generate a joint left merge cost;
add the luma top merge cost and the chroma top merge cost to generate a joint top merge cost; and
select a minimum of the joint cost, the joint left merge cost and the joint top merge cost to generate a final cost.

14. The video encoding system of claim 13, wherein offsets corresponding to the best luma cost are best luma offsets and offsets corresponding to the best chroma cost are best chroma offsets.

15. The video encoding system of claim 14, wherein the best luma offsets comprises at least one of offsets corresponding to the SAO disable cost, the candidate offsets corresponding to the luma minimum band cost and the candidate offsets corresponding to each luma edge cost.

16. The video encoding system of claim 14, wherein the best chroma cost comprises at least one of offsets corresponding to the SAO disable cost, the candidate offsets corresponding to the chroma minimum band cost and the candidate offsets corresponding to each chroma edge cost.

17. The video encoding system of claim 12, wherein the decision block is configured to:
- select the final offsets corresponding to the final left SAO type associated with the left LCU when the final cost is equal to the joint left merge cost;
- select the final offsets corresponding to the final top SAO type associated with the top LCU when the final cost is equal to the joint top merge cost; and
- select the best luma offsets and the best chroma offsets when the final cost is equal to the joint cost.

* * * * *